US010447380B1

(12) United States Patent
Lu et al.

(10) Patent No.: US 10,447,380 B1
(45) Date of Patent: Oct. 15, 2019

(54) PHASED ARRAY WITH INDEPENDENTLY STEERABLE BEAMS

(71) Applicant: Hughes Network Systems, LLC, Germantown, MD (US)

(72) Inventors: Bingqian Lu, Olney, MD (US); Taiwei Yue, Germantown, MD (US); David Roos, Boyds, MD (US); Peter Hou, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/235,494

(22) Filed: Dec. 28, 2018

(51) Int. Cl.
*H04B 7/185* (2006.01)

(52) U.S. Cl.
CPC ..... *H04B 7/18513* (2013.01); *H04B 7/18515* (2013.01)

(58) Field of Classification Search
CPC .... H04B 7/18515; H04B 7/0408; H04B 7/10; H04B 7/185; H04B 7/18513
See application file for complete search history.

(56) References Cited

U.S. PATENT DOCUMENTS

2016/0087339 A1* 3/2016 Bull .................. H01Q 3/34
342/367

* cited by examiner

*Primary Examiner* — Keith Ferguson
(74) *Attorney, Agent, or Firm* — Kilpatrick Townsend & Stockton LLP (57) ABSTRACT

Various antenna systems are presented that have independently steerable receive and transmit beams. The antenna system may include multiple antenna element systems. Each antenna element system may include multiple phase shifters that alter the phase of received signals and signals to be transmitted. Directions of a first transmit beam, a second transmit beam, a first receive beam, and a second receive beam may be steered independently using the phase shifters. Each antenna element system may include a polarization system.

20 Claims, 6 Drawing Sheets

PHASED ARRAY WITH INDEPENDENTLY STEERABLE BEAMS

BACKGROUND

Typically, an antenna of a ground-based node can communicate with a single satellite at a time. Communication with such a satellite may be bidirectional, which can include utilizing different frequencies for uplink communications and downlink communications. Communicating with a single satellite may, in some circumstances, be problematic. For example, a satellite in low earth orbit or middle earth orbit periodically orbits the earth and, therefore, can be expected to be unable to communicate with a stationary or slower-moving ground-based node. Therefore, if communication with the ground-based node is to be maintained, communication between the ground-based node and the satellite may be transitioned to between the ground-based node and a different satellite that is part of the same satellite constellation. In a conventional arrangement, during the transition, a period of time may exist during which the ground-based node cannot exchange data with any satellite of the satellite constellation.

SUMMARY

Various embodiments are described related to an antenna system having independently steerable beams. In some embodiments, an antenna system having independently steerable beams is described. The system may include a plurality of antenna element systems. Each antenna element system of the plurality of antenna element systems may include a first transmit signal input on which a first signal to be transmitted may be received. Each antenna element system of the plurality of antenna element systems may include a second transmit signal input on which a second signal to be transmitted may be received. Each antenna element system of the plurality of antenna element systems may include a first receive signal output through which a third signal received via the antenna element system may be output. Each antenna element system of the plurality of antenna element systems may include a second receive signal output through which a fourth signal received via the antenna element system may be output. The antenna system may include a plurality of phase shifters. A first phase shifter may alter a phase of the first signal. A second phase shifter may alter a phase of the second signal. A third phase shifter may alter a phase of the third signal. A fourth phase shifter may alter a phase of the fourth signal. Directions of a first transmit beam for the first signal, a second transmit beam for the second signal, a first receive beam for the third signal and a second receive beam for the fourth signal may be steered independently using the plurality of phase shifters. The antenna system may include a polarization system. The polarization system may polarize the first signal with a first polarization, may polarize the second signal with a second polarization, and may discriminate the third signal having the first polarization from the fourth signal having the second polarization.

Embodiments of such a system may include one or more of the following features: The polarization system may include a first ninety degree hybrid coupler and a second ninety degree hybrid coupler. The first signal and the second signal may be polarized by the first ninety degree hybrid coupler to have opposite circular polarization and the third signal and the fourth signal may be discriminated by the second ninety degree hybrid coupler to have opposite linear polarization. The phase controller component may control amounts of phase shift applied by the plurality of phase shifters for each antenna element system of the plurality of antenna element systems. The amounts of phase shift applied by the plurality of phase shifters for each antenna element system may allow the first transmit beam, the second transmit beam, the first receive beam, and the second receive beam to be steered by the phase controller component independently. The first signal may have a different frequency than the third signal and the fourth signal. The second signal may have a different frequency than the third signal and the fourth signal. The polarization system may include a meander line polarizer. The meander line polarizer may polarize the first signal and the second signal to have opposite circular polarization and the third signal and fourth signal may be polarized to have opposite linear polarization. The phase controller component may control amounts of phase shift applied by the plurality of phase shifters for each antenna element system of the plurality of antenna element systems. The first signal may have a different frequency than the third signal and the fourth signal. The second signal may have a different frequency than the third signal and the fourth signal.

In some embodiments, a method for independently steering beams of an antenna system is described. The method may include establishing a first bidirectional communication link with a first satellite by aiming a first receive beam of the antenna system and a first transmit beam of the antenna system at the first satellite. The antenna system may include a plurality of phase shifters. A first phase shifter may alter a phase of a first signal. A second phase shifter may alter a phase of a second signal. A third phase shifter may alter a phase of a third signal. A fourth phase shifter may alter a phase of a fourth signal. Directions of the first transmit beam for the first signal, a second transmit beam for the second signal, the first receive beam for the third signal, and a second receive beam for the fourth signal may be steered independently using the plurality of phase shifters. The antenna system may include a polarization system. The polarization system may polarize the first signal with a first polarization, may polarize the second signal with a second polarization, and may discriminate the third signal having the first polarization from the fourth signal having the second polarization. The method may establish a second bidirectional communication link with a second satellite by aiming the second receive beam of the antenna system and the second transmit beam of the antenna system at the second satellite. The method may determine communication with the first satellite may be no longer possible via the first receive beam, the first transmit beam, or both. The method may establish a third bidirectional communication link with a third satellite by aiming the first receive beam and the first transmit beam at the third satellite.

Embodiments of such a method may include one or more of the following features: The polarization system may include a first ninety degree hybrid coupler and a second ninety degree hybrid coupler. The first signal and the second signal may be polarized by the first ninety degree hybrid coupler to have opposite circular polarization and the third signal and the fourth signal may be discriminated by the second ninety degree hybrid coupler to have opposite linear polarization. The antenna system may further include a phase controller component. The phase controller component may control amounts of phase shift applied by the plurality of phase shifters. The amounts of phase shift applied by the plurality of phase shifters for each antenna element system may allow the first transmit beam, the second transmit beam, the first receive beam, and the second receive beam to be steered by the phase controller component independently. The first signal may have a different frequency than the third signal and the fourth signal. The second signal may have a different frequency that the third signal and the fourth signal. The polarization system may include a meander line polarizer. The meander line polarizer may polarize the first signal and the second signal to have opposite circular polarization and the third signal and the fourth signal may be polarized to have opposite linear polarization. The antenna system may further include a phase controller component that may control amounts of phase shift applied by the plurality of phase shifters. The first signal may have a different frequency than the third signal and the fourth signal. The second signal may have a different frequency than the third signal and the fourth signal.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In certain situations, it may be useful to transmit data to multiple satellites simultaneous and/or receive data from multiple satellites simultaneously using a phased array antenna system. The relative position of such satellites to each other and the ground-based node may vary independently of each other. Therefore, the antenna used to transmit and receive data with up to four separate satellites may need to be able to independently form two transmit beams and two receive beams. The frequencies used for transmitting can differ from the frequencies used for transmission.

As an example of when such an arrangement may be useful, consider a low earth orbit (LEO) or middle earth orbit (MEO) satellite constellation that is orbiting the earth. Satellites of the constellation may periodically move into and out of communication range with a ground-based node. The ground-based node may access a network using satellites of the constellation. As satellites move into and out of communication range, the ground-based node may need to switch which satellite is being used to access the network. If only a single satellite can be communicated with at a given time, an amount of downtime during which the network cannot be accessed can be present when the ground-based node is in the process of switching from communicating with a first satellite to communicating with a second satellite. However, if communication with multiple satellites simultaneously is possible, communication sessions may be maintained open with two satellites. Therefore, when one of the two satellites moves out of communication range, network access can be accessed through the second satellite with which a communication session has already been established.

As another example of when the ability to simultaneously communicate with multiple satellites may be useful, a ground-based node may be required to transmit a large volume of data. In order to achieve greater uplink bandwidth, a ground-based node may transmit data to multiple satellites of the constellation simultaneously by forming multiple transmit beams targeting the satellites to which data is to be transmitted. Similarly, if greater downlink bandwidth is needed, a ground-based node may receive data from multiple satellites of the constellation simultaneously by forming multiple receive beams targeting the satellites from which data is to be received. Further, both receive beams may be pointed at the same satellite (the receive beams may operate at different frequencies, with orthogonal polarization, or both) to increase receive bandwidth. Similar arrangements may be present for transmit beams.

Figure 1:
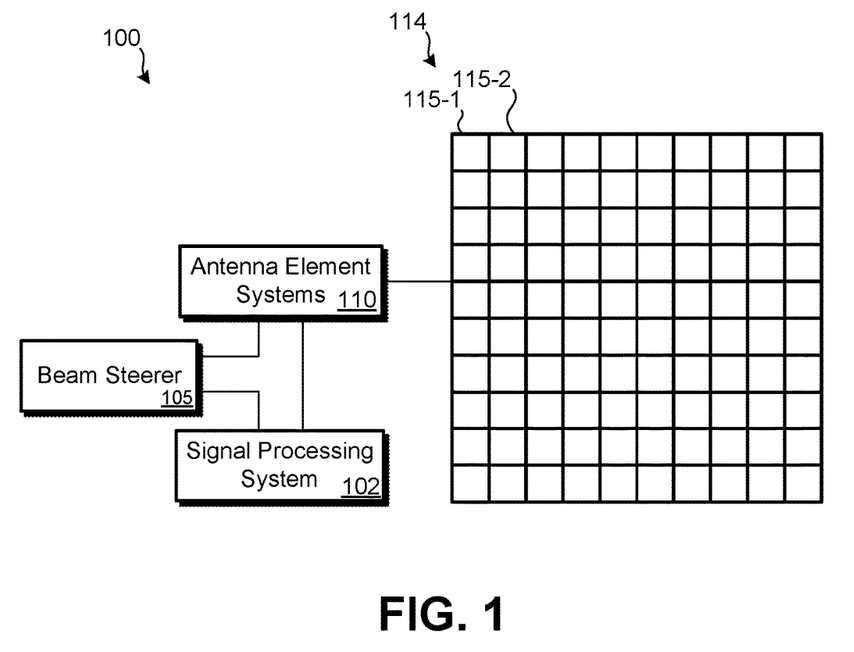
FIG. 1 illustrates a block diagram of an embodiment of an antenna system.

Further detail regarding such embodiments is provided in relation to the figures. FIG. 1 illustrates a block diagram of an embodiment of an antenna system 100. Antenna system 100 may include: signal processing system 102; Beam steerer 105; antenna element systems 110; and phased antenna array 114, which includes antenna elements 115 (115-1, 115-2, etc.). Antenna system 100 may be used by a ground-based node. To be clear, a ground-based node refers to a node that can be mobile or stationary and stays close to the ground (relative to a satellite). For example, a ground-based node could be: a fixed-location communication station; a vehicle; a boat; an airplane; a temporary network interface station, etc.

Signal processing system 102 may generate one or more (e.g., 2) signals for transmission to one or more satellites. Signal processing system 102 may receive and decode one or more (e.g., 2) signals received from one or more satellites. Signal processing system 102 may include one or more processors and/or signal processing components that generate and/or decode signals. Signal processing system 102 may further determine which satellite and/or in which direction receive beams and transmit beams should be pointed. Signal processing system 102 may provide an indication to beam steerer 105 of the direction in which each transmit beam and each receive beam is to be pointed.

Beam steerer 105 may be a separate processing system (e.g., one or more processors) or may be incorporated as part of the one or more processors of signal processing system 102. Beam steerer 105 may determine, for each transmit beam and each receive beam, an amount of phase delay that should be applied at each discrete antenna element of phased array antenna 114 in order for the beam to point in the direction determined by signal processing system 102. Beam steerer 105 may indicate an amount of phase to be introduced by each phase shifter that is part of antenna element system 110. For each antenna element of antenna elements 115, four phase shifters may be present: a first phase shifter for a first transmit signal; a second phase shifter for a second transmit signal; a third phase shifter for a first receive signal; and a fourth phase shifter for a second receive signal. Additionally, beam steerer 105 may adjust the amplitude of the signal provided to each antenna element to create an amplitude taper. Such an arrangement may be useful to satisfy local transmission regulations.

Antenna element systems 110 represent a system that is present for each antenna element of antenna elements 115. Further detail regarding embodiments of antenna element systems 110 is provided in relation to FIGS. 2-4.

Phased array antenna 114 may include a number of antenna elements (e.g., patch antenna elements, horn antenna elements) arranged in a grid (or some other pattern). Phased array antenna 114 may have an approximately planar surface that is generally pointed towards the sky. Phased array antenna 114 may have a large number of antenna elements 115. The greater the number of antenna elements (and associated antenna element systems), the greater the amount of directionality of the transmit and receive beams that can be realized. To communicate with satellites farther away, a greater number of antenna elements 115 may be incorporated at part of phased array antenna 114 to increase the gain in the direction of the satellite. For example, a satellite in geosynchronous equatorial orbit (GEO) is typically a much farther distance away from a ground-based node than a satellite in MEO or LEO. Other types of orbits are also possible, such a polar orbit or elliptical orbit (which may involve the satellite being farther way from the ground-based node than a satellite in GEO. In the embodiment of FIG. 1, phased array antenna 114 is illustrated as having one hundred antenna elements 115 (and, thus, one hundred antenna element systems 110). In other embodiments, fewer or greater numbers of antenna elements may be present, such as thousands of antenna elements 115.

Figure 2:
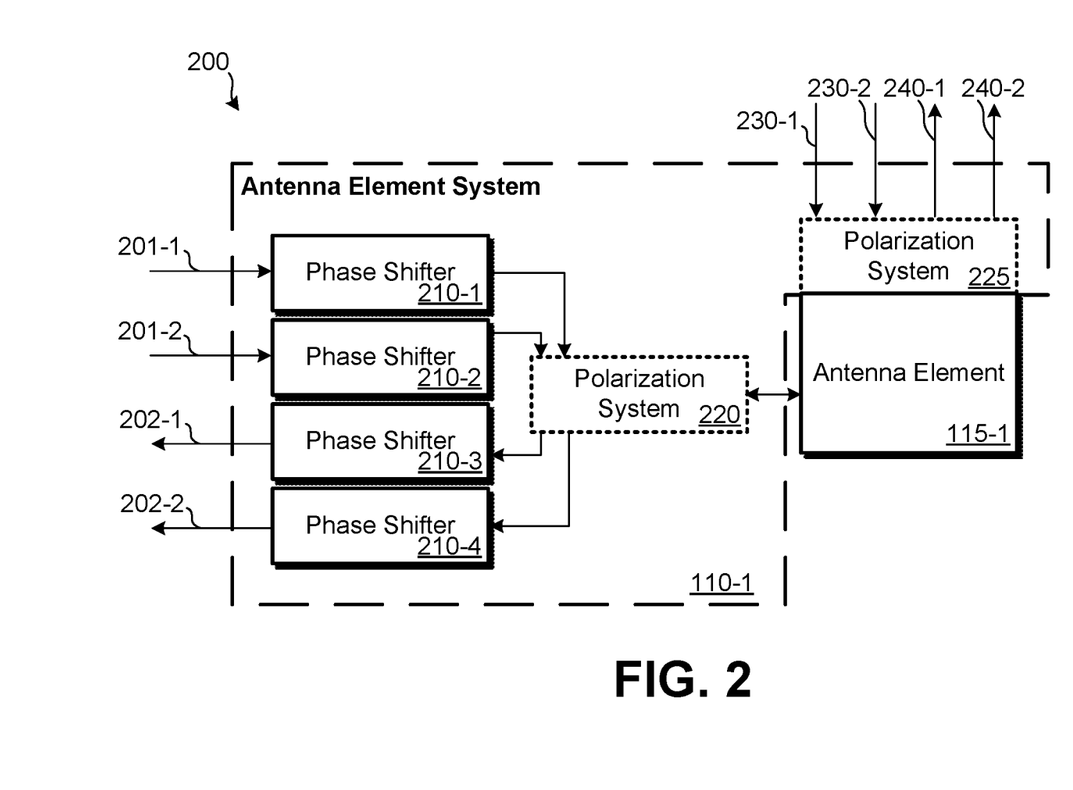
FIG. 2 illustrates a block diagram of an antenna element system.

FIG. 2 illustrates a block diagram of an embodiment 200 of an antenna element system. Antenna element system 110-1 illustrates a single instance of an antenna element system (of antenna element systems 110) that may be connected with a single antenna element 115-1. A similar antenna element system may be present for each of the remaining antenna elements of the phased array antenna. Antenna element system 110-1 may include: phase shifters 210 (210-1, 210-2, 210-3, and 210-4) and polarization system 220 or polarization system 225. Also present may be a first transmit signal input (corresponding to signal 201-1); a second transmit signal input (corresponding to signal 201-2); a first receive signal output (corresponding to signal 202-1); and a second receive signal output (corresponding to signal 202-2). Embodiment 200 may be composed of discrete components or may be built as a single integrated circuit chip.

Signal 201-1 to be transmitted may be received by phase shifter 210-1. Signal 201-2 to be transmitted may be received by phase shifter 210-2. The amount of phase shift, if any, introduced by phase shifters 210-1 and 210-2 may be controlled based on control signals received from beam steerer 105. Polarization system 220, if present, may alter the polarization of signal 201-1 to be different than the polarization of signal 201-2. Polarization system 220 may make signal 201-1 have left hand polarization and signal 201-2 to have right hand polarization. Alternatively, polarization system 220 may make signal 201-1 have vertical polarization and signal 201-2 to have horizontal polarization. Polarization system 220 may include multiple 90 degree hybrid couplers.

After polarization by polarization system 220, signals 201-1 and 201-2 may be transmitted to antenna element 115-1 and radiated as signals 240-1 and 240-2 (without polarization system 225 being present). The difference in phase introduced to signal 201-1 via phase shifters in other antenna element systems may determine the direction in which the transmit beam for signal 201-1 is pointed. Similarly, the difference in phase introduced to signal 201-2 via phase shifters in other antenna element systems may determine the direction in which the transmit beam for signal 201-2 is pointed. Since phase shifter 210-1 and phase shifter 210-2 are controlled independently, the beams for signals 201-1 and 201-2 can be pointed independently of each other based on the phase delays determined by beam steerer 105.

In some embodiments, rather than polarization system 220 being present, polarization system 225 may be present. Polarization system 225 may be removable, such that if the polarization provided by polarization system 225 is not desired to be introduced to signals 240-1 and 240-2, polarization system 225 can be temporarily or permanently removed. Polarization system 225 may be meander line polarizer. Polarization system 225 may introduce polarization after signals 201-1 and 201-2 have been radiated by antenna element 115-1. Polarization system 225 may convert linear polarization to circular polarization. In embodiments in which polarization system 225 is used, signal 201-1 may have vertical or horizontal polarization and signal 201-2 may have the opposite form of linear polarization. Antenna element 115-1 may radiate signals 201-1 and 201-2, which are then converted to circular polarization. Therefore, transmitted signals 240-1 and 240-2, after being polarized by polarization system 225, may have left hand polarization and right hand polarization.

Signals 230-1 and 230-2 may be received by antenna element 115-1 (without polarization system 225 being present). In embodiments having polarization system 220, antenna element 115-1 may receive signals 230-1 and 230-2 (which can be from different satellites) and may provide the received signals to polarization system 220. Polarization system 220 may discriminate the signal having left hand circular polarization from the signal having right hand circular polarization to produce two separate outputs; output signal 230-1 may be output to phase shifter 210-3 and output signal 230-2 may be output to phase shifter 210-4. In performing the discrimination, polarization system 220 may convert the circularly polarized signals to linear polarization; for example, if signal 230-1 has left hand circular polarization, polarization system 220 may convert signal 230-1 to linearly polarized signals.

Phase shifters 210-3 and 210-4 may then apply phase shift to the received and polarized signals 230-1 and 230-2. The amount of phase shift, if any, introduced by phase shifters 210-3 and 210-4 may be controlled based on control signals received from beam steerer 105. The difference in phase introduced to signal 202-1 via corresponding phase shifters in other antenna element systems may determine the direction in which the receive beam for signal 202-1 is pointed. Similarly, the difference in phase introduced to signal 202-2 via corresponding phase shifters in other antenna element systems may determine the direction in which the receive beam for signal 202-2 is pointed. Since phase shifter 210-3 and phase shifter 210-4 are controlled independently, the beams for signals 201-3 and 201-4 can be pointed independently of each other based on the phase delays determined by beam steerer 105.

As previously noted, in some embodiments, rather than polarization system 220 being present, polarization system 225 may be present. Polarization system 225 may alter polarization on signals 230-1 and 230-2 prior to being received by antenna element 115-1. For signals being received, polarization system 225 may convert circular polarization to linear polarization. In embodiments in which polarization system 225 is used, signal 230-1 may have vertical or horizontal polarization and signal 230-2 may have the opposite form of linear polarization. Antenna element 115-1 may receive converted signals 230-1 and 230-2, which have been converted to linear polarization. Therefore, received signals 230-1 and 230-2, after being polarized by polarization system 225, may have opposing linear polarizations when received by antenna element 115-1 and provided to phase shifters 210-3 and 210-4.

Signal 240-1 and signal 240-2 may be of the same frequency or of different frequencies. Signal 230-1 and signal 230-2 may be of the same frequency or of different frequencies. However, signal 201-1 is a different frequency from signals 202-1 and 202-2 and signal 201-2 is a different frequency from signals 202-1 and 202-2.

Figure 3:
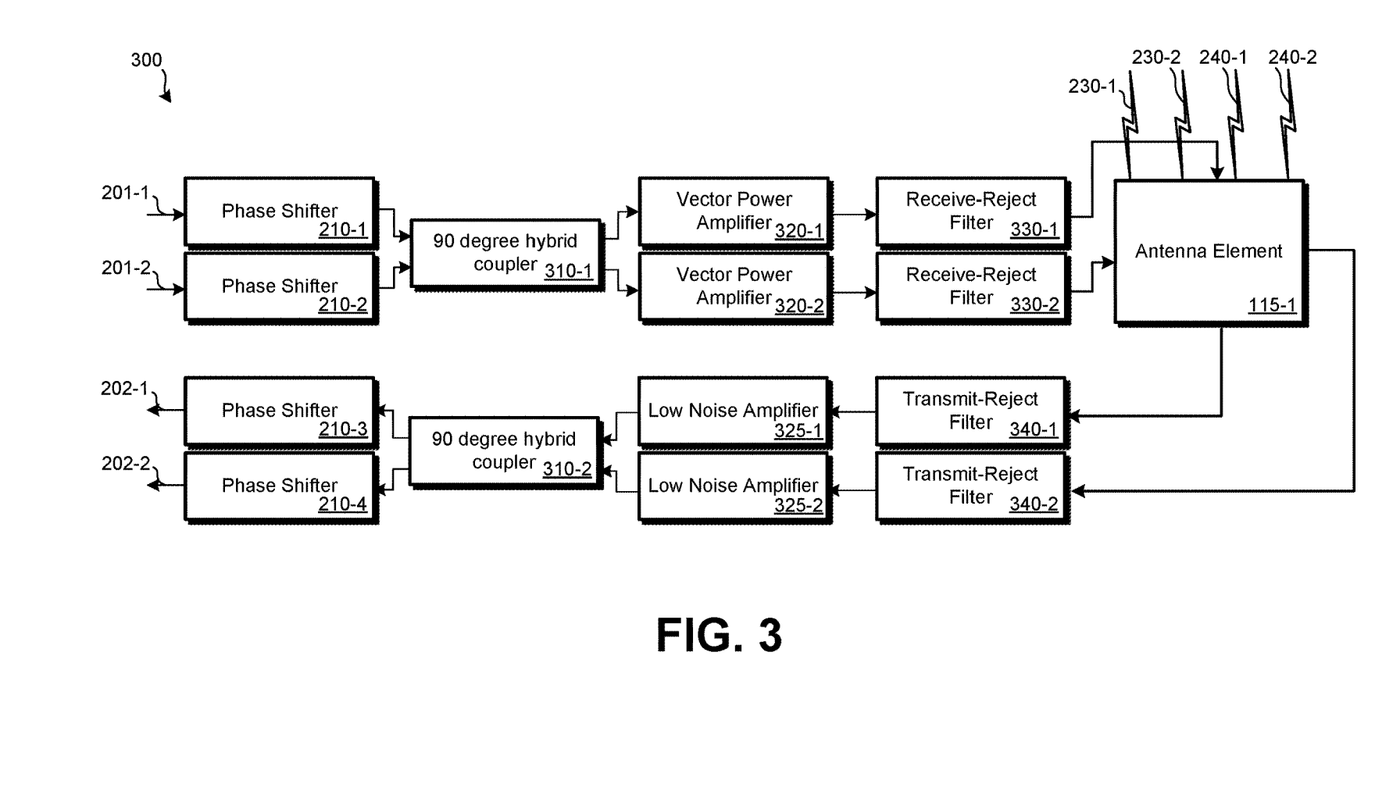
FIG. 3 illustrates an embodiment of an antenna element system.

FIG. 3 illustrates an embodiment of an antenna element system 300. Antenna element system 300 represents a more detailed embodiment of antenna element system 110-1 with polarization system 220 being present. Phase shifters 210 function as detailed in relation to FIG. 2. Antenna element system 300 uses two 90 degree hybrid couplers 310 as polarization system 220 of FIG. 2. Ninety degree hybrid couplers 310 may each be 90 degree 3 dB hybrid couplers that can function to polarize signals 201-1 and 201-2 such that the output signals of 90 degree hybrid coupler 310-1, when radiated by antenna element 115-1, have either left hand circular polarization or right hand circular polarization. For signal 201-1, 90 degree hybrid coupler 310-1 splits the amount of power of signal 201-1 into two components that have a 90 degree phase shift from each other. These two components having a phase shift of 90 degrees are output to vector power amplifiers 320 (a first component signal being output to vector power amplifier 320-1 and a second component signal being output to vector power amplifier 320-2). For signal 201-2, 90 degree hybrid coupler 310-1 splits the amount of power of signal 201-2 into two components that have a −90 degree phase shift from each other. These two components having a phase shift of −90 degrees are output to vector power amplifiers 320 (a first component signal being output to vector power amplifier 320-1 and a second component signal being output to vector power amplifier 320-2). Since one signal pair is offset by 90 degrees and the other signal pair has a phase offset of −90 degrees, the transmitted signals will have opposite circular polarizations (left hand and right hand).

Vector power amplifiers 320-1 and 320-2 may be used to amplify the component signals of signals 201-1 and 201-2. Vector power amplifiers 320-1 and 320-2 can be used to create an amplitude taper and, therefore, control beam shape. As a secondary feature, vector power amplifiers 320-1 and 320-2 can help compensate for uneven line losses. The amplification performed by vector power amplifiers 320-1 and 320-1 may be controlled by a separate controller device, such as signal processing system 102 or may be initially configured at manufacture. In some embodiments, vector power amplifiers 320 may be incorporated as part of beam steerer 105.

Vector power amplifiers 320-1 and 320-2 may output the amplified signals to receive-reject filters 330-1 and 330-2. Receive-reject filters 330-1 and 330-2 may be tuned to block frequencies associated with signals being received by antenna element 115-1 and modified via the receive path of system 300. As such, signals 230-1 and 230-2 may not have any adverse effect on the output of 90 degree hybrid coupler 310-1 or vector power amplifiers 320-1 and 320-3. The transmit signals output through receive-reject filters 330-1 and 330-2 may be output to antenna element 115-1 for transmission as transmit signals 240-1 and 240-2. Due to the phase offset (90° and −90°) in the component signal pairs generated by 90 degree hybrid coupler 310-1, transmit signals 240-1 and 240-2 have opposite circular polarizations of left hand and right hand. The direction in which the transmit beams of which transmit signals 240-1 and 240-2 are a part of may be steered based on the differences in phase introduced using phase shifters 210-1 and 210-2 based on control signals from beam steerer 105. The beams of which transmit signals 240-1 and 240-2 are a part may be aimed towards different satellites or may operate at different frequencies and be transmitted to different transponders of the same satellite (and, thus, be pointed in a same direction).

Signals 230-1 and 230-2 may be separate receive signals having opposite circular polarizations received by antenna element 115-1. These signals are at one or more frequencies that are different from the one or more frequencies of transmit signals 240-1 and 240-2. Transmit-reject filters 340-1 and 340-2 reject one or more frequencies at which transmit signals 240-1 and 240-2 are transmitted. Therefore, the signals being output to antenna element 115-1 are blocked from entering the receive path of the system.

Low noise amplifiers 325-1 and 325-2 may be used to amplify the component signals of receive signals 230-1 and 230-2. The amplification performed by low noise amplifiers 325-1 and 325-1 may be controlled by a separate controller device, such as signal processing system 102 or may be initially configured at manufacture. The two oppositely circularly polarized receive signals may then be input to 90 degree hybrid coupler 310-2. (Alternatively, the signals may have the same polarization, but are at different frequencies.) Each of these oppositely circularly polarized receive signals may include two component signals which have a phase offset of 90° or −90°. The receive signal having the left hand circular polarization may be discriminated from the right hand circularly polarized signal output by 90 degree hybrid coupler 310-2 to phase shifter 210-3 and the receive signal having the right hand circular polarization may be discriminated from the signal having the left hand polarization and output by the 90 degree hybrid coupler 310-2 to phase shifter 210-4. The output signals of 90 degree hybrid coupler 310-2 may have linear polarization.

Phase shifters 210-3 and 210-4 may function as detailed in relation to FIG. 2 and may be controlled by beam steerer 105. After phase shift, if any, is applied by phase shifters 210-3 and 210-4, the processed receive signals are output as separate output signals 202-1 and 202-2. Typically, these separate receive signals may be received from different satellites or different transponders of the same satellite. Since separate phase shifters are used for each of receive signals 230 and each of transmit signals 240, all four of the beams (two receive beams and two transmit beams) can be steered by beam steerer independently. While two receive beams and two transmit beams (full duplex) are possible, it should be understood that only a subset may be used at a given time (e.g., one transmit signal and one receive signal, which can be referred to as half duplex); two transmit signals and no receive signals; two transmit signals and one receive signal; etc.).

Figure 4:
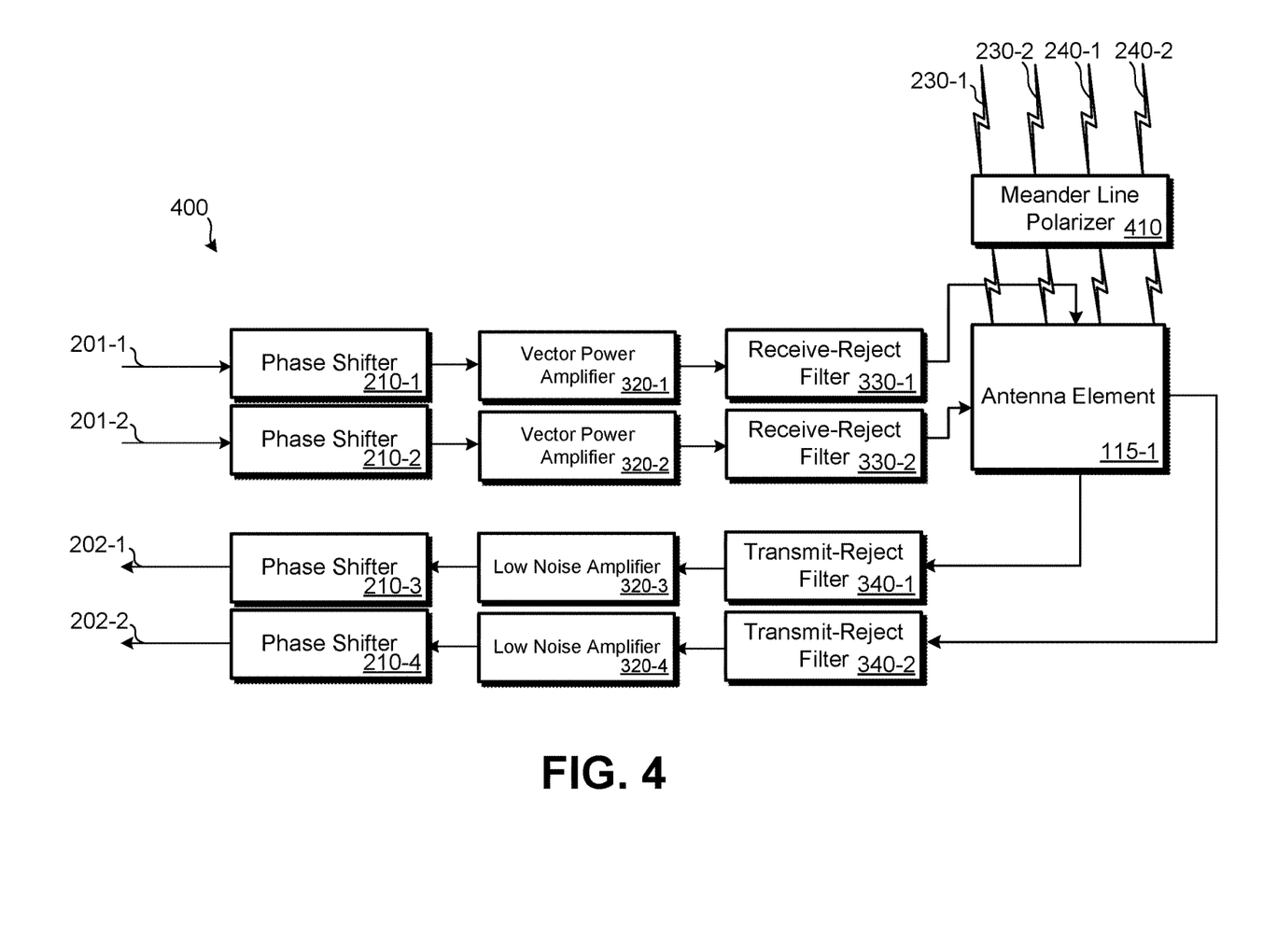
FIG. 4 illustrates another embodiment of an antenna element system.

FIG. 4 illustrates another embodiment of an antenna element system 400. Antenna element system 400 represents a more detailed embodiment of antenna element system 110-1 with polarization system 225 being present. The components of antenna element system 400 may function similarly to system 300, except rather than 90 degree hybrid couplers 310 being present, polarization may be altered differently.

In antenna element system 400, a meander line polarizer 410 is present. Meander line polarizer 410 may convert between circular polarization and linear polarization. Receive signal 230-1 may be converted from left hand circular polarization to vertical or horizontal linear polarization; receive signal 230-2 may be converted from right hand circular polarization to the opposite form of linear polarization. The receive signals that are now linearly polarized may be received by antenna element 115-1.

Similarly, antenna element 115-1 may transmit signals 240-1 and 240-2 with linear polarization, but meander line polarizer 410 converts the linear polarization to circular polarization. Therefore, for example, if transmit signal 240-1 is transmitted using vertical linear polarization, meander line polarizer 410 may convert signal 240-1 to left hand or right hand circular polarization; transmit signal 240-2 may be transmitted using horizontal linear polarization and meander line polarizer 410 may convert signal 240-2 to the opposite form of circular polarization compared to signal 240-1. Whether vertically polarized signals are converted to left hand or right hand circular polarization may be based on the orientation of meander line polarizer 410.

Meander line polarizer 410 may be removable, such as from a surface of antenna element 115-1 such that if transmitting and receiving signals having linear polarization is desired, meander line polarizer 410 can be temporarily or permanently removed.

Figure 5:
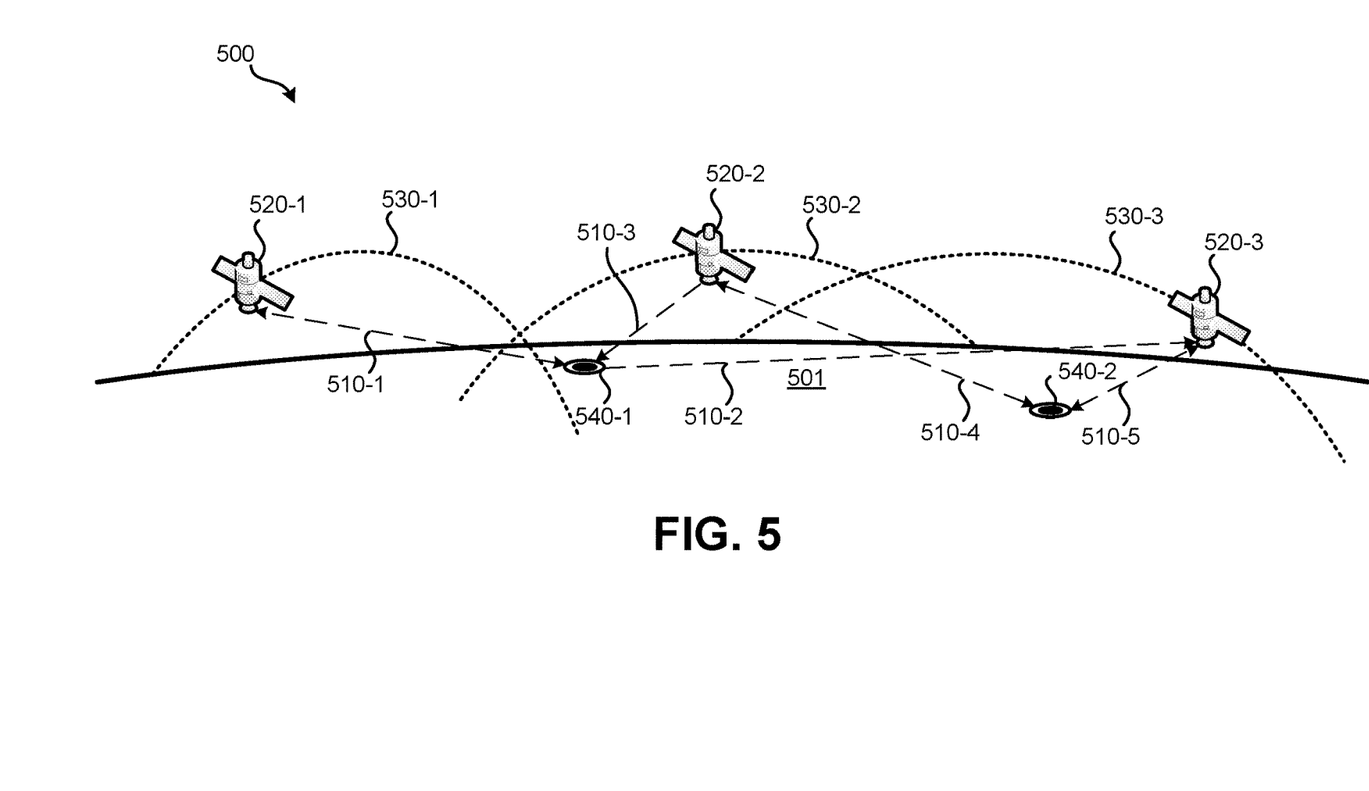
FIG. 5 illustrates an embodiment of a ground-based node communicating with multiple satellites.

FIG. 5 illustrates an embodiment 500 of a ground-based node communicating with multiple satellites. Ground based node may be using antenna system 100, which can include many instances of the embodiments of FIGS. 2-4. In embodiment 500, two ground-based nodes 540-1 and 540-2 are illustrated in different geographical locations on earth 501. Above the earth, is a constellation of satellites that orbits the earth in either LEO, MEO, or elliptical orbit. In other embodiments, one or more satellites may be in a geosynchronous orbit. In illustrated embodiment 500, satellite 520-1 orbits the earth following path 530-1; satellite 520-2 orbits the earth following path 530-2; and satellite 520-2 orbits the earth following path 530-3. As satellites 520 orbit the earth and, possibly, as ground-based nodes 540 move, the directions to the satellites from each ground-based node may change.

Ground-based node 540-1 may point a first receive beam and a first transmit beam along path 510-1 to perform bidirectional communication with satellite 520-1. Ground-based node 540-1 may point a second transmit beam to satellite 520-3 along path 510-2 and a second receive beam along path 510-3 to satellite 520-2. Ground-based node 540-1 may alter the direction of each of these beams over time as satellites 520 orbit the earth and their locations change and, possibly as ground-based node 540-1 moves. For example, a fast moving ground-based node, such as an airplane, may move quickly enough that the movement by ground-based node is not inconsequential.

Referring to ground based node 540-2, an arrangement may be present that allows for continuous communication even as a first satellite moves out of communication range. Ground-based node 540-2 may have a first transmit beam and a first receive beam pointed towards satellite 520-3 along path 510-5. Ground-based node 540-2 may have a second transmit beam and a second receive beam pointed towards satellite 520-2 along path 510-4. In such an arrangement, ground-based node 540-2 may maintain two open bidirectional communication sessions such that when one of satellites 520-2 and 520-3 moves out of range of communication, communication can continue uninterrupted with the other satellite. Therefore, if the satellite constellation is being used by ground-based node 540-2 to access a network, access to the network may be uninterrupted by the satellite moving out of range. When one of the satellites moves out of range, the transmit beam and receive beam that were pointed at the out-of-range satellite, may be repointed towards another satellite that is within range. While embodiments are illustrated in which ground-based nodes communicate with two or three satellites, other embodiments are present in which communication is performed with a single satellite (e.g., via multiple satellite transponders) or four satellites (e.g., a different satellite being used for each receive signal and transmit signal).

Figure 6:
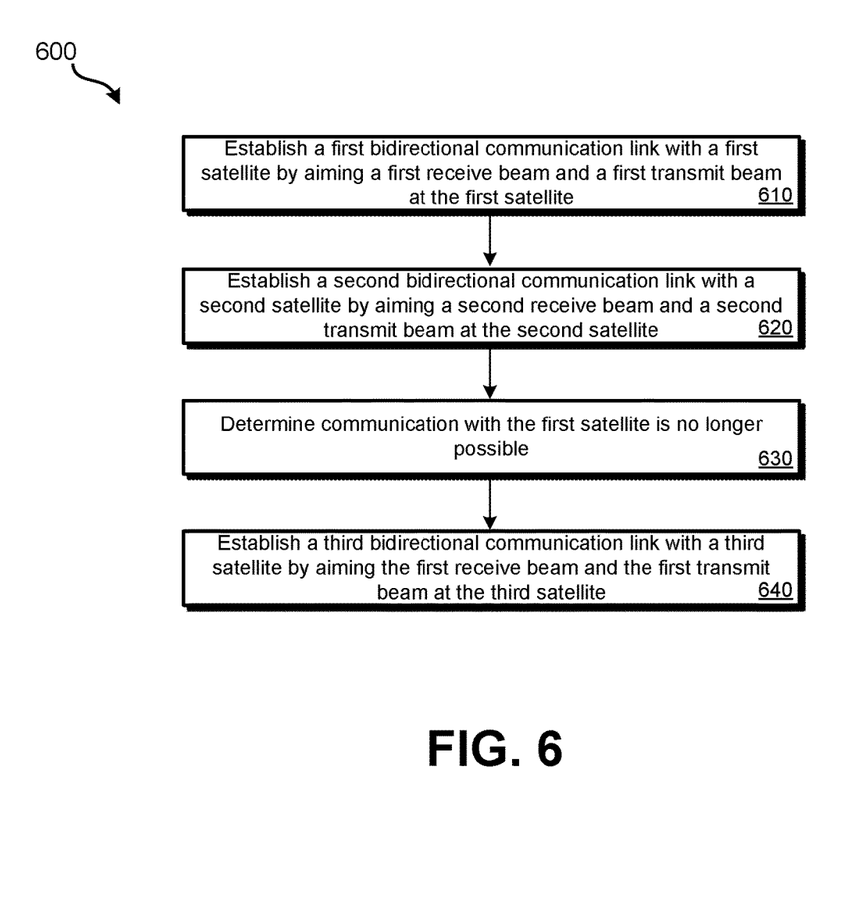
FIG. 6 illustrates an embodiment of a method for transmitting and receiving signals using beams that are independently steerable.

Various methods may be performed by ground-based nodes to effect communication with a constellation of satellites. FIG. 6 illustrates an embodiment of a method 600 for using the systems of FIGS. 1-4 to maintain an uninterrupted bidirectional communication link with a satellite constellation. Method 600 may be performed using the systems of FIGS. 1-4. At block 610, antenna system 100 of a ground-based node may determine a location of a first satellite and aim a first transmit beam and a first receive beam at the first satellite. To aim the first receive beam, the antenna system may adjust the phase delay of a number of phase shifters of antenna element systems that are associated with the first receive beam. Similarly, to aim the first transmit beam, the antenna system may adjust the phase delay of a number of phase shifters of antenna element systems that are associated with the first transmit receive beam. It should be understood that these beams may be aimed completely independently, since different phase shifters are being used to aim the beams. The first transmit beam and the first receive beam can function at different frequencies. The ground-based node may use the first bidirectional communication link to access a network, which may be private or public, such as the Internet.

At block 620, antenna system 100 of a ground-based node may determine a location of a second satellite and aim a second transmit beam and a second receive beam at the second satellite. To aim the second receive beam, the antenna system may adjust the phase delay of a number of phase shifters of antenna element systems that are associated with the second receive beam. Similarly, to aim the second transmit beam, the antenna system may adjust the phase delay of a number of phase shifters of antenna element systems that are associated with the second transmit receive beam. It should be understood that these beams may be aimed completely independently both from each other and the first transmit beam and first receive beam, due to different phase shifters being used to aim each beam. The second transmit beam and the second receive beam can function at different frequencies. The ground-based node may exclusively use the first bidirectional communication link to access a network and may keep the second communication link available for when the first communication link becomes unavailable. Alternatively, bandwidth may be split between the two satellites and, thus, network access may be realized via each satellite through which a communication link is active.

In some embodiments, the first satellite may be in MEO or LEO while the second satellite may in GEO. Assuming that the ground-based node does not travel a large distance, continuous communication with the satellite in GEO may be maintained, even as satellites in MEO or LEO move into and out of communication range.

While both the first and second bidirectional communication link are active, the first and second receive beams and the first and second transmit beams may need to be continually, periodically, or occasionally re-aimed to mirror each satellite's orbit (and, if necessary, to compensate for the movement of the ground-based node). Since each satellite's orbit is independent of each other, there is no fixed relationship between the directions in which the two receive beams or the two transmit beams are pointed; however, since the beams can be independently pointed using the arrangements of FIGS. 1-4, the communication sessions can be maintained.

At block 630, a determination may be made by the ground-based node that the first bidirectional communication link with the first satellite is no longer available, such as due to the orbit of the satellite and/or movement of the ground-based node. At block 640, in response to the first bidirectional communication link no longer being available, communication (e.g., network access) may be maintained through the second bidirectional communication link. While the second bidirectional communication link is being used, the first transmit beam and the first receive beam may be pointed towards another satellite of satellite constellation. Preferably, the first transmit and receive beams may be pointed towards a satellite that is expected to remain within communication range for a significant duration of time, such as until after the second satellite leaves communication range.

This pattern may repeat as satellites continually move into and out of communication range: by independently pointing the receive beams and transmit beams, at least one bidirectional communication session can be maintained open, thus allowing for continuous communication with the satellite constellation, such as for continuous network access.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An antenna system having independently steerable beams, the antenna system comprising:
    a plurality of antenna element systems, wherein each antenna element system of the plurality of antenna element systems comprises:
        a first transmit signal input on which a first signal to be transmitted is received;
        a second transmit signal input on which a second signal to be transmitted is received;
        a first receive signal output through which a third signal received via the antenna element system is output;
        a second receive signal output through which a fourth signal received via the antenna element system is output;
    a plurality of phase shifters, wherein:
        a first phase shifter alters a phase of the first signal; a second phase shifter that alters a phase of the second signal; a third phase shifter that alters a phase of the third signal; and a fourth phase shifter that alters a phase of the fourth signal; and
        directions of: a first transmit beam for the first signal; a second transmit beam for the second signal; a first receive beam for the third signal; and a second receive beam for the fourth signal are steered independently using the plurality of phase shifters; and
    a polarization system, wherein the polarization system: polarizes the first signal with a first polarization, polarizes the second signal with a second polarization, and discriminates the third signal having the first polarization from the fourth signal having the second polarization.

2. The antenna system of claim 1, wherein the polarization system comprises a first ninety degree hybrid coupler and a second ninety degree hybrid coupler.

3. The antenna system of claim 2, wherein the first signal and the second signal are polarized by the first ninety degree hybrid coupler to have opposite circular polarization and the third signal and the fourth signal are discriminated by the second ninety degree hybrid coupler to have opposite linear polarization.

4. The antenna system of claim 3, further comprising a phase controller component, wherein the phase controller component controls amounts of phase shift applied by the plurality of phase shifters for each antenna element system of the plurality of antenna element systems.

5. The antenna system of claim 4, wherein the amounts of phase shift applied by the plurality of phase shifters for each antenna element system allow the first transmit beam, the second transmit beam, the first receive beam, and the second receive beam to be steered by the phase controller component independently.

6. The antenna system of claim 5, wherein: the first signal has a different frequency than the third signal and the fourth signal; and the second signal has a different frequency than the third signal and the fourth signal.

7. The antenna system of claim 1, wherein the polarization system comprises a meander line polarizer.

8. The antenna system of claim 7, wherein the meander line polarizer polarizes the first signal and the second signal to have opposite circular polarization and the third signal and the fourth signal are polarized to have opposite linear polarization.

9. The antenna system of claim 8 further comprising a phase controller component, wherein the phase controller component controls amounts of phase shift applied by the plurality of phase shifters for each antenna element system of the plurality of antenna element systems.

10. The antenna system of claim 9, wherein: the first signal has a different frequency than the third signal and the fourth signal; and the second signal has a different frequency than the third signal and the fourth signal.

11. A method for independently steering beams of an antenna system, the method comprising:
    establishing a first bidirectional communication link with a first satellite by aiming a first receive beam of the antenna system and a first transmit beam of the antenna system at the first satellite, wherein the antenna system comprises:
        a plurality of phase shifters, wherein:
            a first phase shifter alters a phase of a first signal; a second phase shifter that alters a phase of a second signal; a third phase shifter that alters a phase of a third signal; and a fourth phase shifter that alters a phase of a fourth signal; and
            directions of: the first transmit beam for the first signal; a second transmit beam for the second signal; the first receive beam for the third signal; and a second receive beam for the fourth signal are steered independently using the plurality of phase shifters; and
        a polarization system, wherein the polarization system: polarizes the first signal with a first polarization, polarizes the second signal with a second polarization, and discriminates the third signal having the first polarization from the fourth signal having the second polarization;
    establishing a second bidirectional communication link with a second satellite by aiming the second receive beam of the antenna system and the second transmit beam of the antenna system at the second satellite;
    determining communication with the first satellite is no longer possible via the first receive beam, the first transmit beam, or both; and
    establishing a third bidirectional communication link with a third satellite by aiming the first receive beam and the first transmit beam at the third satellite.

12. The method for independently steering beams of the antenna system of claim 11, wherein the polarization system comprises a first ninety degree hybrid coupler and a second ninety degree hybrid coupler.

13. The method for independently steering beams of the antenna system of claim 12, wherein the first signal and the second signal are polarized by the first ninety degree hybrid coupler to have opposite circular polarization and the third signal and the fourth signal are discriminated by the second ninety degree hybrid coupler to have opposite linear polarization.

14. The method for independently steering beams of the antenna system of claim 13, wherein the antenna system further comprises a phase controller component, wherein the phase controller component controls amounts of phase shift applied by the plurality of phase shifters.

15. The method for independently steering beams of the antenna system of claim 14, wherein the amounts of phase shift applied by the plurality of phase shifters for each antenna element system allow the first transmit beam, the second transmit beam, the first receive beam, and the second receive beam to be steered by the phase controller component independently.

16. The method for independently steering beams of the antenna system of claim 15, wherein: the first signal has a different frequency than the third signal and the fourth signal; and the second signal has a different frequency than the third signal and the fourth signal.

17. The method for independently steering beams of the antenna system of claim 11, wherein the polarization system comprises a meander line polarizer.

18. The method for independently steering beams of the antenna system of claim 17, wherein the meander line polarizer polarizes the first signal and the second signal to have opposite circular polarization and the third signal and the fourth signal are polarized to have opposite linear polarization.

19. The method for independently steering beams of the antenna system of claim 18, wherein the antenna system further comprises a phase controller component that controls amounts of phase shift applied by the plurality of phase shifters.

20. The method for independently steering beams of the antenna system of claim 19, wherein: the first signal has a different frequency than the third signal and the fourth signal; and the second signal has a different frequency than the third signal and the fourth signal.

* * * * *